United States Patent [19]

Susser et al.

[11] 3,984,612
[45] Oct. 5, 1976

[54] METHOD AND APPARATUS FOR PROTECTION OF METAL HEATING ELECTRODES OF MELTING FURNACES BY DC CURRENT

[75] Inventors: Vaclav Susser; Zdenek Habrman; Ivan Lade, all of Hradec Kralove, Czechoslovakia

[73] Assignee: Statni Vyzkumny Ustav Sklarsky, Hradec Kralove, Czechoslovakia

[22] Filed: Apr. 30, 1975

[21] Appl. No.: 573,062

[30] Foreign Application Priority Data
May 6, 1974 Czechoslovakia .................. 3240-74

[52] U.S. Cl. .......................................... 13/6; 13/23
[51] Int. Cl.² ............................................ C03B 5/02
[58] Field of Search .................................. 13/6, 23

[56] References Cited
UNITED STATES PATENTS

| | | |
|---|---|---|
| 2,855,450 | 10/1958 | Eden ......................................... 13/6 |
| 3,378,618 | 4/1968 | Vach et al. ............................... 13/6 |
| 3,530,221 | 9/1970 | Penberthy ................................ 13/6 |

*Primary Examiner*—Harry Moose
*Attorney, Agent, or Firm*—Burgess, Ryan and Wayne

[57] ABSTRACT

Metal heating electrodes of melting furnaces are protected against reduction of ions from a silicate melt by superposition of DC current on the AC heating current and by forming and maintaining on these electrodes a passivation layer with a higher electric specific resistance than the resistance of the melt.

10 Claims, 2 Drawing Figures

METHOD AND APPARATUS FOR PROTECTION OF METAL HEATING ELECTRODES OF MELTING FURNACES BY DC CURRENT

BACKGROUND OF THE INVENTION

The invention relates to a method for the protection of metal heating electrodes of melting furnaces against reduction of ions, particularly of cations, contained in a silicate melt, by the use of a DC current, wherein the positive pole of the DC current source is connected to the heating electrodes and the negative pole is connected to at least one auxiliary electrode. The invention also relates to an arrangement for performing this method, comprising metal heating electrodes connected to a source of AC current and to the positive pole of a source of AC current and to the positive pole of a source of DC current and comprising also at least one auxiliary electrode connected to the negative pole of the source of DC current.

Electric melting of silicates by direct passage of electric current through the melt is at present generally accomplished with the use of metal heating electrodes, especially molybdenum electrodes.

If the melt contains some cations, for instance cations of lead, which is a component of lead crystal glass, of arsenic and antimony, used for melting of glass as clarifying agent, of iron, contained for instance in basalt, of nickel used for black enamels or of copper, chromium or manganese used as color admixtures to glass melts, a reaction with the metal of the heating electrode occurs and, according to the concentration of the cations in the melt and to melting conditions, even to the separation of the cations on the heating electrodes. The material of the heating electrodes is corroded by this reaction and the deposited metal flows to the bottom of the furnace, where it accumulates, corrodes the bottom and can even depreciate the melt by color striae. This reaction can also cause an increased formation of bubbles. If the concentration of these cations, for instance of $Pb^{+2}$, in the melt is higher, the corrosion and the separation in metal shape can be so intensive that the electric melting becomes ineffective in operation. Alternatively, electrodes other than metal electrodes may be used, but this solution to the problem has certain disadvantages.

An electrochemical method is known in which tubes, cables, ships and similar objects are protected against corrosion by cathodic polarisation. The protected parts are in this case conductors of electrons and the electrolytic properties of the solution and the whole course of corrosion are well known.

Methods are also known for the protection of heat resistant furnace materials, which are conductors of ions. According to the French Pat. No. 994,796, the positive pole of a DC source is connected to a heat resistant wall of a melting aggregate and the negative pole is connected to graphite heating electrodes. According to the French Pat. No. 1,126,690, it is possible to protect parts which come in contact with the glass mass, such as passage ways, floaters, stirring elements, dosing elements and the like against corrosion by the glass melt by superposing DC current on the AC heating current, whereby the negative pole of the DC current is connected to the protected part and the positive pole is connected to one or more auxiliary electrodes of platinum or other material which is resistant to the glass melt. Another solution is disclosed in French Pat. No. 1,277,999, wherein conditions are created so that a polarisation current flows between the heat resistant material and the auxiliary electrode of platinum, molybdenum or steel, namely from this electrode to the protected heat resistant body. The method disclosed in German Democratic Republic Pat. No. 64,845 utilizes the fact that a transient layer wth a rectifying property is created if a DC source is connected between the heat resistant material and an auxiliary metal electrode, so that the electric current can pass in one direction only, namely from the melt to the heat resistant material. If the source of DC current is connected in opposite direction to this rectifying layer, i.e., the positive pole to the heat resistant material and the negative pole to the auxiliary metal electrode, only a small current can pass. The small current is sufficient, however, to shift the voltage of the heat resistant material to a zone with small corrosion. When the polarity is opposite, a protective effect is equally obtained, since two opposite flows of the glass mass are mutually compensating in the border layer. That is, a conventional normal glass flow occurs due to the heat gradient and a conventional flow of the glass mass occurs due to polarisation of the heat resistant material at a low current density of 3 $mA/cm^2$.

These methods assure that the protected parts are provided with coatings of conductive material, for instance of metal, graphite, MgO, SiC and similar and are particularly suitable for protection of sufficiently conductive materials, particularly of electrically molten cast refractory materials having an $Al_2O_3$, $ZrO_2$ base. In addition, at current densities above 1 $mA/cm^2$, a corrosion of the refractory material occurs at the region of contact of metal conductors with this material, due to the electric current, and in the region of the auxiliary electrodes with the glass melt an electrolytic decomposition of the melt occurs which appears in the form of bubbles. This problem is eliminated by the method of protection of fireclay, according to the Czechoslovak Pat. Nos. 136,876 and 136,877, with a current of a density below 1 $mA/cm^2$, whereby the conductive elements are connected to a transition layer created on the heat resistant material at its contact with the melt. A method according to Czechoslovak Pat. No. 132,369 protects the heat resistant materials with an external metal coating connected to ground.

These methods have as an object the prevention of any dissolution of oxides in the heat resistant material, and their release into the melt. None of these methods is, however, capable of preventing a reduction of ions, particularly of cations, from the melt on heating electrodes.

Methods of protection of electrodes by DC current are also known. According to French Pat. No. 982,980, the electrodes are connected to a source of AC current and to a DC circuit, whereby they act as anodes, The DC circuit is connected to prevent passage of AC current. This method is suitable when graphite electrodes are used, and its object is the prevention of coloring of the glass mass, particularly of borosilicate glass, by the electrodes. In a further known method of protection of heating electrodes, according to the U.S. Pat. No. 3,530,221, one pole of the source of DC current is connected to a system of electrodes made of a material resistant to anions and the other pole is connected to a system of electrodes resistant to cations. Positive electrodes are for instance of tin dioxide or platinum, negative electrodes of molybdenum or graphite. Even this method cannot prevent a reduction of ions on metal heating electrodes.

SUMMARY OF THE INVENTION

It is an object of this invention to provide a method of protection of metal heating electrodes of melting furnaces which, with given conditions, prevents or at least substantially limits any reduction of ions on metal heating electrodes of these furnaces. According to this method a passivation layer is created and maintained on the heating electrodes by DC current, in dependence on the temperature and composition of the melt and on the current density of the AC current. This passivating layer has a higher specific electric resistance than the resistance of the melt. The current density of the DC current is advantageously maintained at an equal level on the individual electrodes and along their length. This is achieved, according to the invention, if the auxiliary electrode is made of a material having an electrode potential which, in the given melt, is more positive than the deposition potential of the cation capable to be reduced from the melt. As a consequence, the absolute value of the difference of the deposition potential of the cation capable of being reduced from the melt, and the electrode potential of the material of the heating electrodes, is smaller than the absolute value of the difference of the deposition potential of the cation capable of being reduced from the melt, and the potential of the electrode material of the auxiliary electrode. The auxiliary electrode advantageously comprises a heat resistant wall of the melting furnace.

Due to superposition of DC current on the AC heating current at conditions stipulated in accordance with the invention, protective or passivating layers are formed on the metal heating electrodes in the melt. These layers do not have a rectifying effect on the electric current passing therethrough and are capable of being removed by uninterrupted action of the DC current. The layers prevent any reduction of ions, particularly of cations on the metal heating electrodes. If the conditions of the relationship of the potentials in accordance with the invention are maintained, reduction of cations on the auxiliary electrode is also prevented. Thus the life of the electrodes is increased by the formation of the passivating layer. As a consequence, it is possible to electrically melt glasses and other materials such as minerals, salts and enamels, the electric melting of which was very uneconomical or even impossible in prior methods. The connection of the heat resistant wall of the furnace to the negative pole of DC current represents a simplification of construction while providing a uniform density of DC current on the heating electrodes.

In order that the invention will be more clearly understood, it will now be explained in greater detail, with reference to the accompanying drawing, wherein:

FIG. 1 is a cross-sectional elevation of a furnace, which may be employed in accordance with the invention; and FIG. 2 is a cross-sectional view of the top of the furnace of FIG. 1, and further illustrating the interconnection of the heating and auxiliary electrodes.

DESCRIPTION OF PREFERRED EMBODIMENTS

Figure 1:
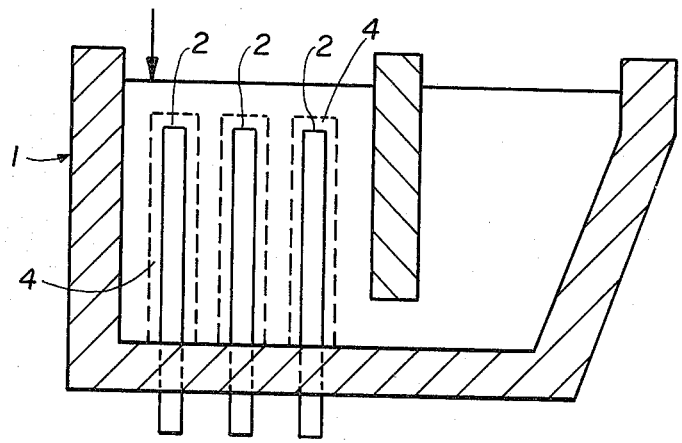

Referring now to the drawings, therein is illustrated, a melting tank 1 of heat resistant material, having an $Al_2O_3$, $ZrO_2$ base. The drawing illustrates six heating electrodes 2 of molybdenum, positioned in the tank 1, although it will be apparent that different members of such electrodes may be employed. The sidewalls of the melting tank 1 form an auxiliary electrode 3, and conductive feeders 4 of a heat resistant material, such as nickel, are connected to the sidewalls of the tank. It is apparent, of course, that the auxiliary electrodes need not be formed by the sidewalls of the melting tank 1, but may alternatively be, for example, of a different material, such as nickel or stannic oxide and located directly within the melt at substantially equal distances from each of the heating electrodes 2.

Figure 2:
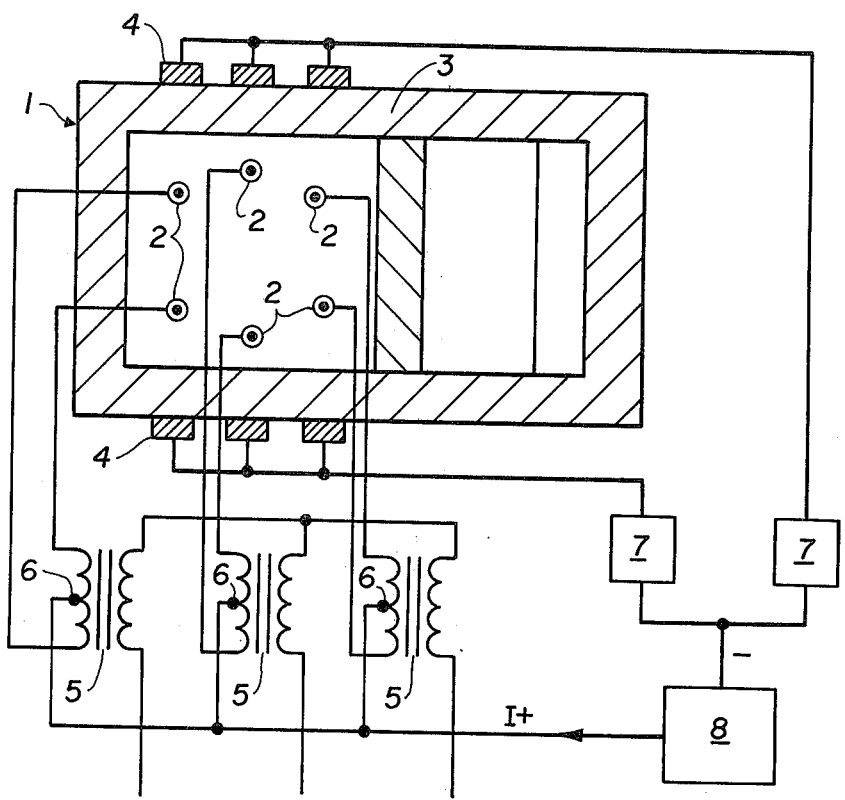

As illustrated in FIG. 2, the heating electrodes 2 are connected to the secondary windings 6 of heating transformers 5, whereby pairs of the heating electrodes 2 are connected to opposite ends of common secondary windings 6. The primaries of these transformers are connected to a suitable AC source (not shown), for example, with the interconnection shown in the drawing, to a three-phase source.

The feeders 4 are connected by way of separating elements 7, which may be electric filters comprised of inductances and capacitances, to the negative pole of a source 8 of direct current. The positive pole of the source 8 of direct current is connected to center taps of the secondary windings 6 of the heating transformers 5.

EXAMPLE 1

Lead crystal glass with a content of 24 percent of PbO was melted in a melting tank of a furnace of heat resistant material of $Al_2O_3$, $ZrO_2$ base with a capacity of $2t/24h$. The furnace was heated by ten molybdenum heating electrodes 2 of a diameter 50 mm, inserted to a depth of 70 cm into the glass mass. When a DC current of an amplitude of 18 amps. was supplied to this system, a passivation layer was created on the heating electrodes 2, which showed an increase of the resistance between the heating electrodes of from 2 to 10 percent. The deposition potential of Pb in this melt at 1350°C was −0.2V, the electrode potential of molybdenum electrodes at this temperature was −0.58V and the electrode potential of the heat resistant material, forming the auxiliary electrodes 3 at 1350°C was +0.6V. The feeders 4 were of nickel and were connected to the sidewalls forming the auxiliary electrode 3, so that the transition resistance was as small as possible.

EXAMPLE 2

This Example is analogical to Example 1 with the exception that, instead of lead crystal glass, sodium-potassium crystal glass containing 0.7 percent of CuO as coloring agent, was melted in a furnace of a capacity $2t/24h$ at a temperature of 1400°C. When DC current of an amplitude of 1 amp. passed through this system, a passivation layer was created on the heating electrodes 2, showing in an increased resistance between the heating electrodes from 2 to 3 percent. The deposition potential for Cu in the sodium-potassium glass melt at 1400°C is −0.4V. The electrode potential of Mo in the sodium-potassium glass melt colored by CuO at 1400°C is 0.65V and the electrode potential of the heat resistant material forming the auxiliary electrodes 3 at 1400°C is 0.48V.

EXAMPLE 3

Black fritted glass for enamelling, containing 1.5 percent RiO, was melted in a melting tank of heat resistant material of SiO₂ base of a furnace 1 of a capacity of 6t/24h, and heated by molybdenum heating electrodes 2 of a diameter 50 mm inserted to a depth of 35 cm into the melt by a power of 350 to 370 KW supplied to the heating electrodes. When DC current of an intensity of 5 amps. was supplied to the heating electrodes 2 and to the auxiliary electrodes 3 of nickel, a passivation layer was created on the heating electrodes 2, showing in an increase of the resistance between the heating electrodes of from 2 to 4 percent. The deposition potential of Ni in this melt is 0.5V, the electrode potential of heating electrodes 2 of molybdenum in this melt at temperatures of 1100°C is 0.6V and the electrode potential of nickel is 0.5V. As long as the conditions of the method of protection are maintained, the condition of relation of electrode potentials and of the deposition potential need not be fulfilled.

The amplitude of DC current where the maximum protection effect is achieved is determined for each kind of glass, for the technologically suitable melting temperature, and for the current load of heating electrodes and according to the material chosen for the heating and auxiliary electrodes, by evaluating the path of curves obtained from different measurements of the degree of corrosion of the electrodes and the intensity of the DC current. The electrode potentials and the deposition potentials are measured with respect to a Pt reference electrode for the respective glass type and temperature.

What is claimed is:

1. In an apparatus for melting a melt, including a tank for containing the melt, and a plurality of heating electrodes disposed within said tank; a source of AC current, a source of DC current, means connecting said heating electrodes to said source of AC current for providing heating current for heating said melt, auxiliary electrode means, means connecting the positive pole of said source of DC current to said heating electrodes, and means connecting said auxiliary electrode means to the negative pole of said source of DC current, the improvement wherein said auxiliary electrode being comprised of a material having an electrode potential which, in said melt, is more positive than the deposition potential of cations of said melt which are capable of reduction from the melt, the absolute value of the difference between the deposition potential of said cations and the electrode potential of said heating electrodes being smaller than the absolute value of the difference between said deposition potential of said cations and the electrode potential of the material of the auxiliary electrode means, whereby said metal heating electrodes are protected against the reduction of said cations.

2. The apparatus of claim 1, wherein said auxiliary electrode means comprises heat-resistant walls of said tank.

3. The apparatus of claim 1, wherein said tank has heat-resistant walls, said walls comprising said auxiliary electrode means, said means connecting said negative pole of said source of DC current to said auxiliary electrode means comprising a plurality of conductive feeders arranged on the outside of said walls, and electric filter means connected between said feeders and said negative pole.

4. A method for protecting metal heating electrodes of a melting furnace against reduction of ions, wherein a melt is melted by passing AC heating current between said metal heating electrodes, said method comprising passing DC current between said metal heating electrodes and auxiliary electrode means connected to said melt of a sufficient amplitude to form and maintain a non-rectifying passivation layer on said metal heating electrodes having a higher specific resistance than the resistance of the melt, by connecting the positive pole of a DC current source to said metal heating electrodes and connecting the negative pole of said source to said auxiliary electrode means.

5. The method of claim 4 wherein said step of passing said DC current comprises applying said current to flow between said metal heating electrodes and auxiliary electrode means, increasing said DC current until the resistance between said metal heating electrodes increases, and maintaining said DC current to maintain said increased resistance between said metal heating electrodes.

6. The method of claim 5 wherein said step of increasing said DC current comprises increasing said DC current until said resistance increases at least 2%.

7. The method of claim 5 wherein said step of increasing said DC current comprises increasing said DC current until said resistance between said metal electrodes increases from 2–10%.

8. The method of claim 4 wherein said melt is a glass melt, comprising selecting said auxiliary electrode to be of a material having an electrode potential that is more positive than the deposition potential of cations of said melt capable of being reduced from the melt.

9. The method of claim 4 comprising maintaining the amplitude of said DC current in dependence on the temperature and composition of said melt and on the current density of said AC heating current, to maintain said non-rectifying passivation layer.

10. The method of claim 4 comprising maintaining the density of said DC current on the individual heating electrodes and along the lengths of the individual metal heating electrodes at substantially the same level.

* * * * *